Nov. 28, 1950 A. L. LANGEL 2,532,109
MULTIPLE BAKING PAN
Filed April 12, 1946 2 Sheets-Sheet 2
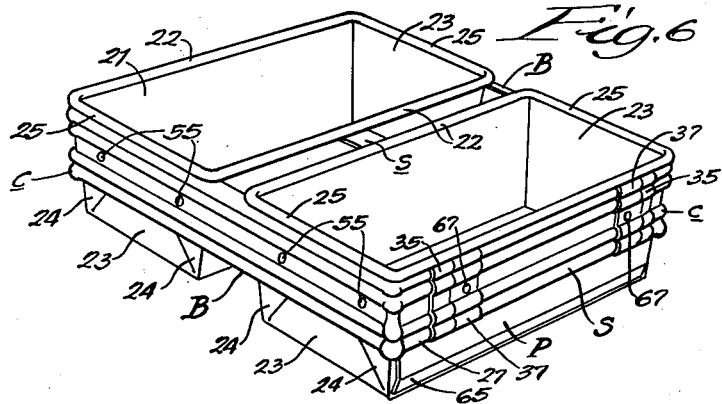
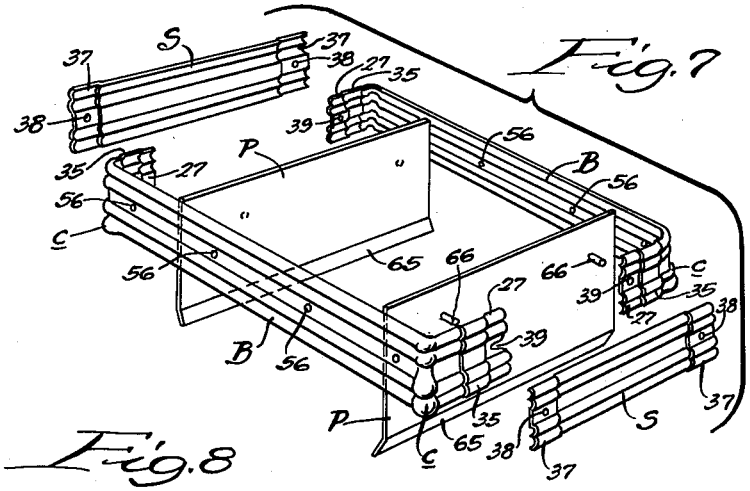
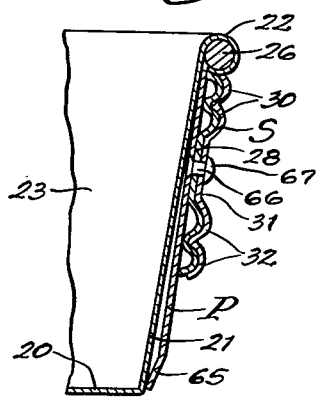
Inventor:
Adrien L. Langel,
By Flemming & Flemming
Attorneys Patented Nov. 28, 1950

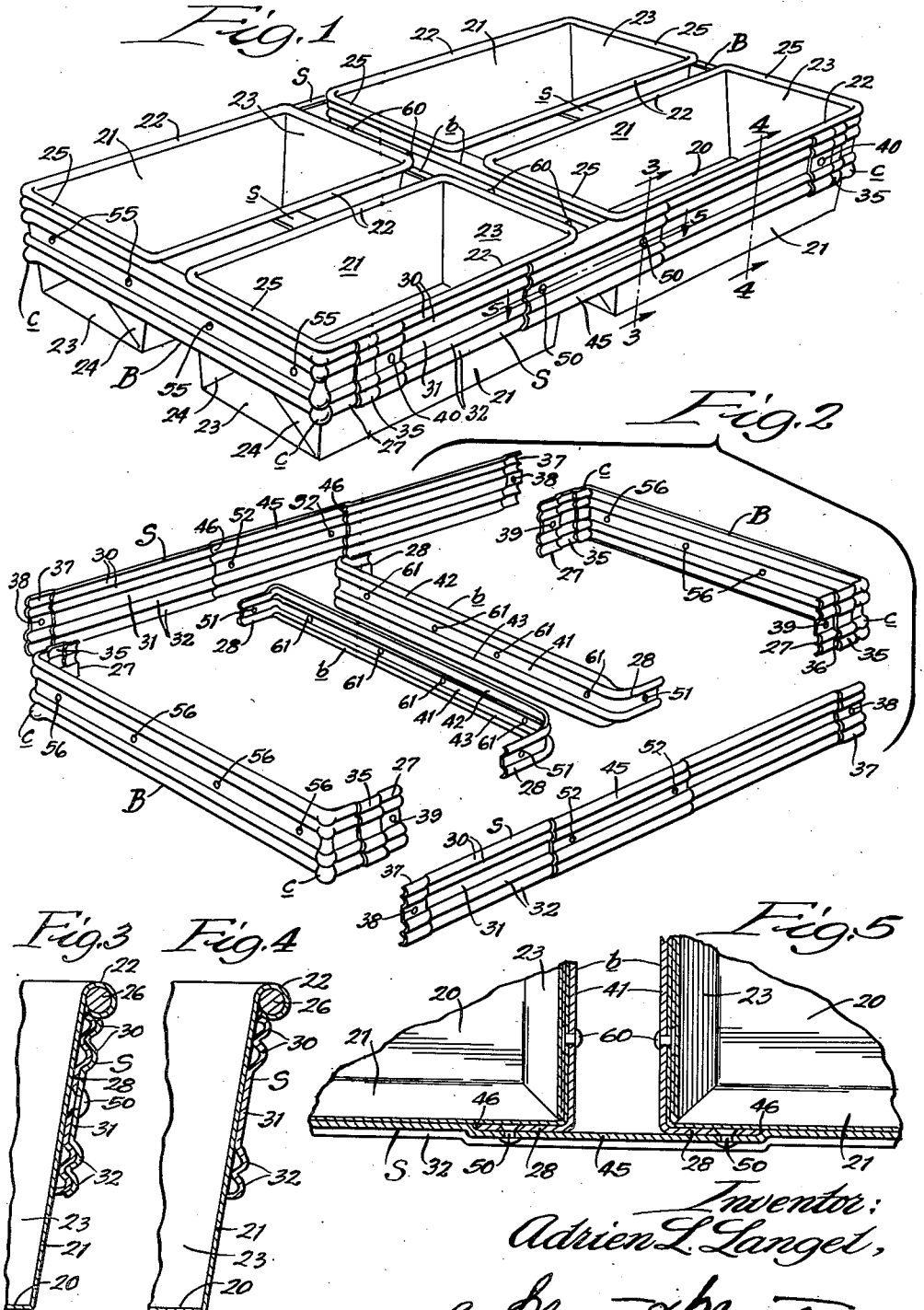

2,532,109

UNITED STATES PATENT OFFICE 2,532,109

MULTIPLE BAKING PAN

Adrien L. Langel, Chicago, Ill., assignor to Chicago Metallic Manufacturing Company, Chicago, Ill., a corporation of Illinois Application April 12, 1946, Serial No. 661,837

2 Claims. (Cl. 220—23.2)

The present improvements relate generally to multiple baking pans, i. e. a plurality of like pans which are fixedly united into a set for convenience in handling and use. More particularly, I am here concerned with the uniting of two or more rows of pans into a single unit. A plural row pan set has certain advantages, but, on account of the difficulty in supporting pans so arranged within a common framework having the necessary strength and lightness, little or no progress has been made in gaining acceptance for pan sets of this character.

A further object of my invention is the assembly of end protection plates with the supporting framework for a pan set whether of the single or plural row type. Such a protection plate, according to my invention, may be incorporated with the framework in such a way as to protect the proximate end of a pan row and also to serve as a medium for secure interconnection of frame parts which support the pans that are comprised in the same row. Each protection plate is endowed with ample strength for its intended purpose, and furthermore makes for a simple and sturdy connection between itself and the associated pan and supporting frame parts, as will hereinafter appear. By the means herein disclosed I have provided a novel and improved construction affording various advantages in the direction of durability, economy, lightness, simplicity, and strength all as will hereinafter appear, one suggestive embodiment of my invention being illustrated in the accompanying drawing in the manner following:

Figure 1 is a perspective view of a plural row pan set united by the supporting framework of my invention in a preferred form;

Fig. 2, which is a similar view except only that the pans are omitted, shows the parts of the framework arranged in their respective positions prior to assembly and connection with the supported pans;

Figs. 3, 4, and 5 are details in section, somewhat enlarged, taken respectively on lines 3—3, 4—4, and 5—5 of Fig. 1;

Fig. 6, which is a view similar to Fig. 1, shows an assembly of baking pans comprising an end protection plate forming part of the supporting framework;

Fig. 7 shows the framework parts and protection plates arranged in their respective positions prior to assembly and connection with the supported pans; and Fig. 8 is a fragmentary, vertical section, enlarged, taken through the plane of one of the interconnections between a protection plate and the pan framework.

In the showing of Figure 1 four pans are assembled into a unit which comprises two rows of two pans each. This is a convenient number and arrangement for purposes of illustration and description. While the number of pans comprised in each unit may be varied somewhat, they will probably be arranged in side-by-side relation in rows of from two to six pans each.

The pans herein shown and described, and for which I have provided a special connecting framework, are preferably duplicates of each other. Each is formed with a sheet metal bottom 20 from opposite edges of which rise sides 21 which along their upper edges 22 are curled outwardly, downwardly, and then inwardly (see Figs. 3 and 4) to provide a marginal bead. Also rising from other opposite edges of the pan bottom are ends 23 with triangular two-ply wings 24 representing excess of material folded over to lie against the pan ends whose upper edges 25 are also curled outwardly, downwardly, and then inwardly to provide a marginal bead in continuation of those along the top edges of the pan sides. Within the beaded edges of the pan is desirably secured a reenforcing wire 26. Both the sides and end walls may be inclined outwardly to a slight extent to facilitate nesting of one pan set with another.

The means by which several pans may be united into a set, with certain of the pan end walls aligned to form sides of the pan unit, is a rectangular supporting frame comprising a band B extended alongside of the outer ends of two slightly spaced pans, and a connecting brace b extended alongside of the inner ends of the same pans, opposite ends of the band and brace being turned around reenforcing corners c through 90° to provide ears 27 and 28, respectively, which lie alongside of, and engage for a distance, the proximate outer sides of the two pans which may be maintained spaced apart a fixed distance with the aid of an appropriate intervening stay s. Two other like pans (according to the number here chosen for illustration) to be united in the same set are also provided with a frame band B and a connecting brace b, the former positioned alongside the outer ends of two pans and the latter alongside the inner ends thereof. The ends of this band and brace are turned toward each other, the same in the case of the band and brace first described. A pair of frame straps S are then placed alongside the outer sides of the four pans when arranged as shown in Fig. 1, each strap extending lengthwise of two pans to points close to the far corners thereof so as to overlap the band ears 27. Each strap is bent longtiudinally upon itself to form a pair of outwardly protruded ribs 30 extending above a central web 31 below which is another pair of outwardly protruded ribs 32. The upper and lower strap edges are extended toward the pan ends so as to lie substantially in engagement therewith.

As shown best in Fig. 2, the band is formed for most, if not all, of its length with a cross sectional contour substantially the same as the strap so that like parts thereof bear corresponding reference characters. The turned ends, however, i. e. the ears 27 are for a short distance outset at 35 to provide ribs defining a vertical shoulder 36 against which may abut opposite ends of the straps which are there outset at 37. Formed through the webs 31 of the strap and band, at their points of overlap, are registering holes 38 and 39, respectively, for receiving a fastener such as a rivet 40. In this way each band end is interfitted with and locked to the straps whose ends lie in abutting relation to the shoulders 36.

The length of the straps and bands is such as to provide a frame which will accommodate a plurality of pans arranged in plural rows with a fixed spacing between adjacent pans. This is achieved in part by the braces b which extend alongside the inner ends of the pans with their ears 28 turned to lie upon the pan outer sides where they are overlapped by the straps S. The cross sectional contour of the braces comprise a central web 41 above and below which are outwardly extended pairs of ribs 42 and 43, the outermost of which terminate at the corner bends and along the ears 28 where the vertical dimension of each brace is somewhat reduced. The special ribbed contour which characterizes the straps may be reproduced in the bands B, from end to end, both to improve the appearance and strength and to furnish in the ears 27 ribbed elements complementary to and in cooperation with those in the straps whereby to promote a secure and accurate interfit therewith. This same observation applies to the ribbed contour of the brace ends 28 in their relation to the strap S which, it will be noted, is outset at 45 to provide a panel having a length sufficient to accommodate the oppositely turned ears 28 of the adjacent braces, the inner vertical shoulders 46 at opposite ends of each panel being adapted to engage the brace ends (see Fig. 5).

Interconnections between the straps, bands, braces, and pans (additional to the rivets 40) may be provided by other rivets 50 which traverse holes 51 in the brace ears and registering holes 52 in the outset panels of the straps, by rivets 55 which traverse holes 56 in the band B and registering holes in the wings 24, at the outer ends of the pans, and by rivets 60 which traverse holes 61 in the webs of the braces b and registering holes in the wings 24 at the inner ends of the pans. In every such case, the rivet head which is exposed to view is protected by the adjacent ribs which protrude outwardly both above and below.

The construction herein described may also include provision for assembly of protection plates P with the framework. While two such plates are usually employed, one at each end of a pand row, I have shown but one such plate for simplicity of illustration. Each such plate may conveniently be installed along an outer side of the pan row, to be secured fixedly in position with the aid of the strap S. As shown, the lower edge portion 65 of each protection plate is desirably angled inwardly to firmly engage the pan side walls near their bottoms, and at points near their tops carry pins 66 which are outwardly extended to pass through the holes 39 in the turned ears 27 of the bands and then through the holes 38 near the strap ends. To facilitate the assembly one of the band holes may be in the form of an open-ended slot, as shown. The top edge of each protection plate is adapted to abut the underside of the out-turned reenforcing bead along the top edge of the proximate band.

With the parts so arranged and assembled, the outer ends of the rivets are then upset to form heads 67 thereby locking the straps to the bands and the protection plate to both. This assembly of protection plates with the framework for a pan set may, with equal advantage, be employed with multiple pans united either in a single row or in plural rows. Since the construction of the framework illustrated in Figs. 6–8 may follow that which has been described in connection with Figs. 1–5, like parts have been designated by corresponding reference characters thereto.

The structure herein disclosed comprises a framework whose parts—the straps, bands, and braces—are interfitted, and so interengaged as to effectively withstand shocks incident to usage. The butt engagement obtaining between the strap ends and the band ears, and between the brace ends and the strap, provides assurance of this fact. The rivet connections which are suggested as simple and appropriate fasteners for securing the frame parts together are accordingly subjected to little or no shearing stress, consequently may be relied upon to serve adequately over a long period of service. Any shocks resulting from impacts intermediately of the strap ends will be resisted effectively by the braces which intervene between the pans, so that damage thereto or to the framework may be successfully withstood. And each protection plate, when incorporated into the framework assembly, serves as a medium of interconnection between itself and the associated pan and frame parts so as to simplify the structure while safeguarding the adjacent pan from damage resulting from a blow or impact directed against an otherwise exposed outer wall of the pan set.

I claim:

1. A multiple baking pan comprising a plurality of like pans arranged side by side in plural rows, and a framework for uniting all the pans comprising side bands extending along the sides of the pans in all the rows, the ends of the bands being offset to provide vertical shoulders, the bands in the region between rows being offset to provide vertical shoulders, end bands disposed along the ends of the pans and being flanged at their opposite ends to engage the first mentioned shoulders on the side bands, and straps disposed between the side bands in the region between rows, and flanges on the opposite ends of the straps adapted to engage the last mentioned shoulders on the side bands.

2. A multiple baking pan comprising a plurality of like pans arranged side by side in plural rows, and a framework for uniting all the pans comprising side bands extending along the sides of the pans in all the rows, the ends of the bands being offset to provide vertical shoulders, the bands in the region between rows being offset to provide vertical shoulders, end bands disposed along the ends of the pans and being flanged at their opposite ends to engage the first mentioned shoulders on the side bands, and straps disposed between the side bands in the region between rows, and flanges on the opposite ends of the straps adapted to engage the last mentioned shoulders on the side bands, each of the bands and straps being longitudinally ribbed.

ADRIEN L. LANGEL.

REFERENCES CITED

The following references are of record in the file of this patent:

UNITED STATES PATENTS

| Number | Name | Date |
|---|---|---|
| Re. 13,327 | Thien | Nov. 28, 1911 |
| 1,047,256 | Lockwood | Dec. 17, 1912 |
| 2,073,892 | Ward | Mar. 16, 1937 |
| 2,116,490 | Katzinger | May 3, 1938 |
| 2,260,782 | Langel | Oct. 28, 1941 |
| 2,323,922 | Langel | July 13, 1943 |
| 2,407,021 | Langel | Sept. 3, 1946 |